(12) United States Patent
Woods et al.

(10) Patent No.: US 10,313,726 B2
(45) Date of Patent: *Jun. 4, 2019

(54) DISTRIBUTING MEDIA CONTENT VIA MEDIA CHANNELS BASED ON ASSOCIATED CONTENT BEING PROVIDED OVER OTHER MEDIA CHANNELS

(71) Applicant: Sizmek Technologies, Inc., Austin, TX (US)

(72) Inventors: David Woods, Marietta, GA (US); Justin Haygood, Marietta, GA (US); Brian Bober, Smyrna, GA (US)

(73) Assignee: Sizmek Technologies, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,504

(22) Filed: Jul. 20, 2017

(65) Prior Publication Data

US 2017/0318321 A1 Nov. 2, 2017

Related U.S. Application Data

(63) Continuation of application No. 14/533,784, filed on Nov. 5, 2014, now Pat. No. 9,716,908.

(51) Int. Cl.
*H04N 21/2665* (2011.01)
*H04N 21/61* (2011.01)
*H04N 21/2668* (2011.01)
*H04N 21/234* (2011.01)
*H04N 21/24* (2011.01)
*H04N 21/235* (2011.01)
*H04N 21/81* (2011.01)

(52) U.S. Cl.
CPC ..... *H04N 21/2665* (2013.01); *H04N 21/2353* (2013.01); *H04N 21/23418* (2013.01); *H04N 21/2407* (2013.01); *H04N 21/2668* (2013.01); *H04N 21/6118* (2013.01); *H04N 21/6125* (2013.01); *H04N 21/812* (2013.01)

(58) Field of Classification Search
CPC ......... H04N 21/23418; H04N 21/2353; H04N 21/2407; H04N 21/2665; H04N 21/2668; H04N 21/6118; H04N 21/6125; H04N 21/812
See application file for complete search history.

(56) References Cited

U.S. PATENT DOCUMENTS

2006/0268895 A1* 11/2006 Kotzin ................... H04N 5/445
370/395.64
2012/0158985 A1* 6/2012 Patten ................... H04L 65/608
709/231

* cited by examiner

*Primary Examiner* — Rong Le
(74) *Attorney, Agent, or Firm* — M&B IP Analysts, LLC

(57) ABSTRACT

Systems and methods are disclosed for providing access to media content via a media channel based on associated content being provided over a different channel. In some aspects, it is determined that a media identifier corresponds to media content provided over a first media channel. In response to the determination, a notification facilitation system can identify multiple computing devices that have been configured to receive additional media content that is associated with the media content provided over the first media channel. The notification facilitation system can provide access to the additional media content via a second media channel by the identified computing devices in response to identifying the plurality of computing devices.

11 Claims, 8 Drawing Sheets

DISTRIBUTING MEDIA CONTENT VIA MEDIA CHANNELS BASED ON ASSOCIATED CONTENT BEING PROVIDED OVER OTHER MEDIA CHANNELS

TECHNICAL FIELD

This disclosure relates generally to computer-implemented methods and systems and more particularly relates to distributing or otherwise providing access to media content via a media channel based on associated content being provided over a different media channel.

BACKGROUND

Media providers provide or otherwise manage access to media content channels. For example, a user may have a subscription to a cable television provider or other multi-channel media provider. The subscription allows a user to access multiple channels of media content from different media providers (e.g., a news channel, a cooking channel, a movie channel, etc.) via the cable television provider. Some providers of media content may provide access to media content over the Internet in addition to providing televised content. For example, a news organization may broadcast news programs over a cable television channel and provide access to the same or similar news programs via the news organization's website.

Users may simultaneously access media content via different media channels. For example, a user may browse the Internet on a laptop computer while also viewing television programming on a television. Advertisers and other content providers may wish to maximize views of advertisements and other media content on different devices.

It is therefore desirable to facilitate the simultaneous provision of related or associated items of media content over different media channels.

SUMMARY

According to certain aspects, a notification facilitation system can provide access to media content via a media channel (e.g., a website accessed by a computing device) based on associated content being provided over a different channel (e.g., a cable television channel). For example, the notification facilitation system can determine that a media identifier corresponds to media content that is being provided via a first media channel. Based on determining the correspondence between the media identifier and the media content provided over the first media channel, the notification facilitation system can identify multiple computing devices that have been configured to receive additional media content that is associated with the first media content. The notification facilitation system can provide access to the additional media content by the identified computing devices via a second media channel.

These illustrative aspects are mentioned not to limit or define the disclosure, but to provide examples to aid understanding thereof. Additional aspects and examples are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
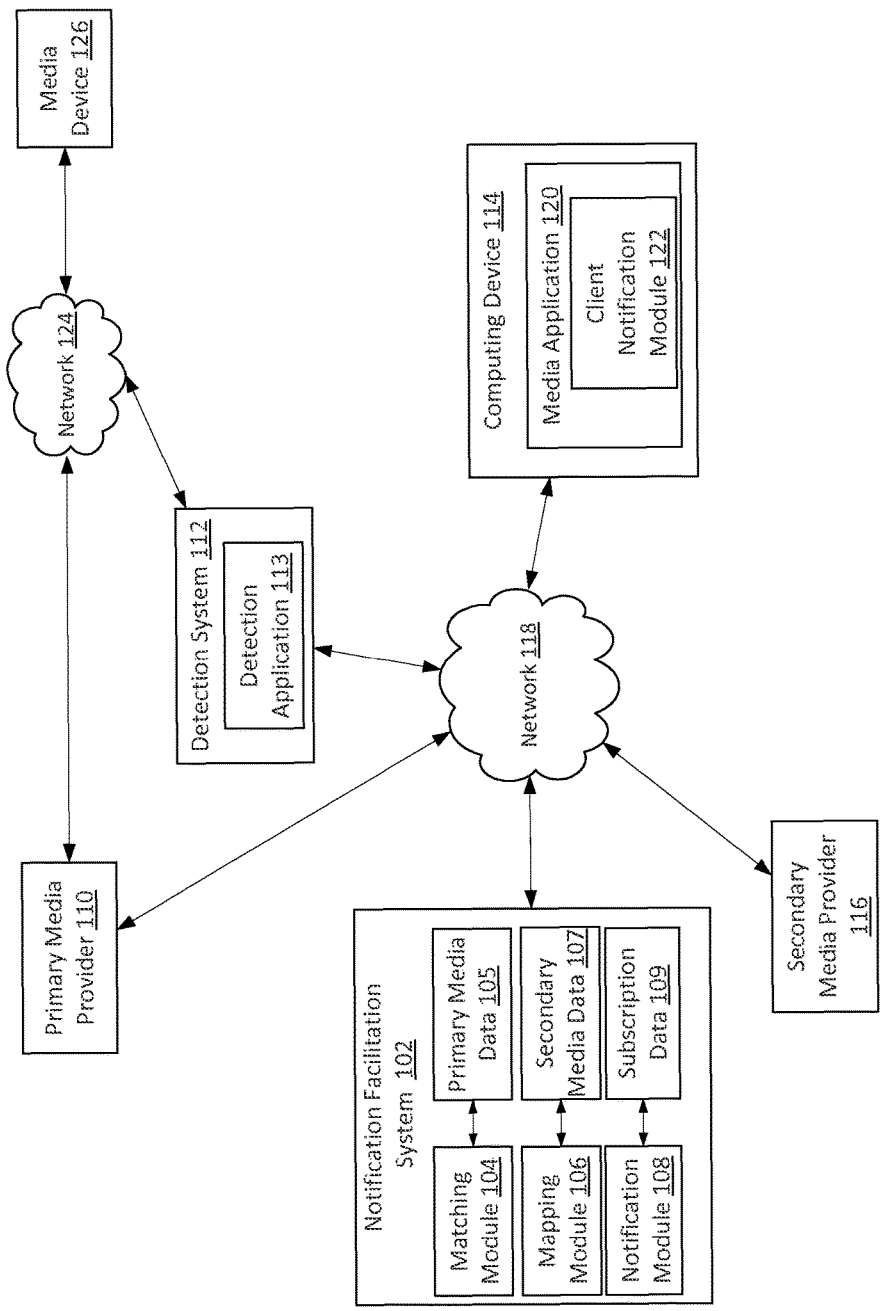
FIG. 1 is a block diagram that depicts an example of a system for detecting specified media content being provided over a first media channel and facilitating the provision of associated media content over a second media channel according to certain aspects.

Computer-implemented systems and methods are disclosed for distributing or otherwise providing access to media content via a media channel based on associated content being provided over a different media channel. For example, a server system may determine that advertising content is being transmitted via a cable television channel and instruct a computing device to access other advertising content over the Internet that is related to the advertising content being transmitted via the cable television channel. Thus, if a user views the cable television channel on a television while also browsing the Internet with the computing device, related advertising content may simultaneously displayed on both the television screen and the computer screen.

In accordance with some aspects, a notification facilitation system can determine that a media identifier corresponds to media content that is being provided via a first media channel. In one non-limiting example, a notification facilitation system determines the correspondence based on receiving an electronic communication indicative of the correspondence from a remote computing system. For instance, the remote computing system may execute an automatic content recognition process for analyzing media content provided via the first media channel and determining that a fingerprint of the media content matches a reference fingerprint. In another non-limiting example, the notification facilitation system can perform the automatic content recognition process. Based on the correspondence between the media identifier and the media content provided over the first media channel, the notification facilitation system can identify multiple computing devices that have been configured to receive additional media content that is associated with the first media content. In a non-limiting example, the notification facilitation system may determine that advertising content being transmitted via a cable television channel corresponds to a reference fingerprint and may identify computing devices that are configured to receive related advertising content over the Internet. The notification facilitation system can provide access to the additional media content via a second media channel by the identified computing devices in response to identifying the plurality of computing devices. In some aspects, providing access to the additional media content can involve transmitting information to the identified computing devices that can be used to retrieve the additional media content (e.g., a uniform resource locator ("URL")). A media application executed at a computing device can retrieve and execute the additional media content. In additional or alternative aspects, providing access to the additional media content can involve transmitting the additional media content to the computing devices.

As used herein, the term "media content" is used to refer to electronic content that is transmitted by a media provider over a media channel. Non-limiting examples of media content can include image content, video content, audio content, textual content, or some combination thereof. For example, media content can include online advertising content that is streamed or otherwise provided from a website to a computing device.

As used herein, the term "media identifier" is used to refer to data that is used to uniquely identify or otherwise reference specific content provided by a media provider. Non-limiting examples of media identifiers include video or audio fingerprints, watermarks, alphanumeric identifiers, etc.

As used herein, the term "media channel" is used to refer to any manner of delivering media content to a computing device or other media device (e.g., a television). In one non-limiting example, a media channel may be a television channel. In another non-limiting example, a media channel may be a website hosted by a provider of media content, such as a website that provides online access to news programs that are also provided over a television channel. In another non-limiting example, a media channel may be a section of a website that is used to host content by a specific media content provider. For example, a cable television provider may host a website that includes a first section for content provided by a news channel, a second section for content provided by a movie channel, etc.

As used herein, the term "media provider" is used to refer to an entity or service that can provide electronic media content over one or more media channels. Non-limiting examples of electronic media content include video content, audio content, etc. In some aspects, the media provider may provide access to multiple media channels over different types of communication networks. For example, a cable television provider may provide televised media content that is accessible via a cable television channel and online media content that is accessible via a website.

As used herein, the term "media application" is used to refer to any application that can be used to display, execute, or otherwise use media content provided via a media channel. In some aspects, a media application can access media content over different channels. For example, a web browser application may access media content from different channels over different websites. In additional or alternative aspects, a media application can be an application that is designed for accessing media content over specific channels. In a non-limiting example, a provider of online video content (e.g., a news website) may provide an application (e.g., "NewsTV") that can be installed on a computing device and used specifically to access video content from only that provider. In some aspects, such a media application may be a native application that is specifically configured to access content from a given media channel and, unlike a web browser, may be unable to access content from other media channels.

Referring now to the drawings, FIG. 1 is a block diagram that depicts an example of a system for detecting specified media content being provided over a first media channel and facilitating the provision of associated media content over a second media channel. The system depicted in FIG. 1 can include a notification facilitation system 102 that can communicate with one or more primary media providers 110, a detection system 112, one or more computing devices 114, and one or more secondary media providers 116. The various systems and devices depicted in FIG. 1 can communicate data via a network 118 such as the Internet or other suitable data network.

As used herein, the terms "primary media content" and "primary media provider" are used to refer to media content transmitted over a monitored media channel and an entity providing the transmitted media content, respectively. The terms "secondary media content" and "secondary media provider" are used to refer to additional media content transmitted over an additional media channel in response to a detection of primary media content being transmitted over the monitored media channel and an entity providing the additional media content, respectively. A non-limiting example of primary and/or secondary media content is advertising content. Although FIG. 1 depicts the primary media provider 110 and the secondary media provider 116 as separate functional blocks, other implementations are possible. For example, the same media provider may transmit both primary content over a first media channel (e.g., a television channel) and secondary content over a second media channel (e.g., an Internet connection).

The notification facilitation system 102 can facilitate the delivery of secondary media content to the computing device 114 via a media channel of the network 118 (e.g., an Internet connection) simultaneously or near simultaneously with primary content being transmitted over a media channel of the network 124 (e.g. a television channel). In some aspects, the notification facilitation system 102 can include a server system or a group of server systems configured for cloud computing. Non-limiting examples of a computing device 114 include a laptop computer, a tablet computer, a smart phone, or any other suitable device that can execute a media application 120 for executing, displaying, or otherwise using media content from the secondary media provider 116. As described herein, the secondary media content from the secondary media provider 116 can be selected based on the secondary media content being related to or otherwise associated with primary media content that can be provided to a media device 126 via another media channel (e.g., a cable television connection) of the network 124.

The performance of this selection can be at least partially automated such that access to the secondary media content can be provided simultaneously or nearly simultaneously with at least some of the primary content being transmitted over a media channel of the network 124. Providing secondary media content simultaneously or nearly simultaneously with at least some of the primary content being transmitted over a media channel of the network 124 can allow related content accessible via different types of media channels to be presented simultaneously on different types of devices.

The notification facilitation system 102 can include one or more processing devices that execute program instructions for facilitating the delivery of secondary media content to the computing device 114. The program instructions stored at or accessible by the notification facilitation system 102 can include one or more software modules. For example, FIG. 1 depicts a matching module 104, a mapping module 106, and a notification module 108. The matching module 104, the mapping module 106, and the notification module 108 can be used to generate and communicate data with other systems accessible via the network 118. Although FIG. 1 depicts the matching module 104, the mapping module 106, and the notification module 108 as separate modules for illustrative purposes, other implementations are possible. For example, one or more functions performed by the matching module 104, the mapping module 106, and the notification module 108 may be performed by a common module, application, or other set of program instructions.

The notification facilitation system 102 can also include one or more non-transitory computer-readable media for storing primary media data 105, secondary media data 107, and subscription data 109. The primary media data 105, the secondary media data 107, and/or the subscription data 109 can be stored as databases or other suitable data structures.

The primary media data 105 can include media identifiers that can be used for referencing different primary media content provided by the primary media provider 110. A media identifier can be any data that can uniquely identify or otherwise reference specific media content provided by the primary media provider 110. Non-limiting examples of these media identifiers include video or audio fingerprints, watermarks, etc.

The matching module 104 can be used to add data to and retrieve data from the primary media data 105. For example, a management interface can be presented at the notification facilitation system 102 or a computing device in communication with the notification facilitation system 102. The management interface can be used for adding data to the primary media data 105. For example, the management interface can be used to upload or otherwise identify primary media content to the notification facilitation system 102. The matching module 104 or another suitable module executed by the notification facilitation system 102 can assign, generate, or otherwise obtain a media identifier for the primary media content that is uploaded or otherwise identified using the management interface.

In a non-limiting example, a fingerprinting module can generate reference fingerprints from a media content. The fingerprinting module can be notified of media content (e.g., videos) to be fingerprinted from a queue managed by a management module of the notification facilitation system 102. The fingerprinting module can download or otherwise access the media content identified in the queue. The fingerprinting module can generate a reference fingerprint (e.g., an audio fingerprint) that can be used by the detection application 113 (e.g., a fingerprint generated using a selected automatic content recognition technology). The matching module 104 can store the generated fingerprint in the primary media data 105. In some aspects, the generated fingerprint can be associated with identifiers for one or more secondary media content items (e.g., an identifier for one or more advertising campaigns).

The secondary media data 107 can include data that can be used to request, retrieve, or otherwise obtain specific secondary media content items from the secondary media provider 116. Non-limiting examples of the secondary media data 107 include one or more of an identifier of an advertisement or other secondary media content item, account information for a secondary media provider 116 that provides secondary media content, visual characteristics of secondary media content items (e.g., width, height, etc.), a type of application programming interface used to access the advertisement or other secondary media content item (e.g., Open Rich Media Mobile Advertising ("ORMMA"), Mobile Rich Media Ad Interface Definitions ("MRAID"), etc.).

The mapping module 106 can be used to add data to and retrieve data from the secondary media data 107. For example, a management interface can be presented at the notification facilitation system 102 or a computing device in communication with the notification facilitation system 102. The management interface can be used for accessing the mapping module 106 and thereby adding data to the secondary media data 107.

The subscription data 109 can include data describing or otherwise identifying account information used by computing devices 114 to access the notification facilitation system 102. The subscription data 109 can be used by the notification module 108 to determine whether to transmit (or facilitate the transmission of) secondary media content to a given computing device 114. Non-limiting examples of account information may include one or more of an identifier for the computing device 114 (e.g., a network address, a hardware identifier, etc.), an identifier for a user of a computing device 114 (e.g., a user name, an account number, etc.), hardware characteristics of the computing device 114 (e.g., device type, screen size, etc.), an application type for the media application 120 or a type of primary media content accessed by the media application 120, an identifier of a secondary media provider 116 from which the media application 120 receives secondary media content, etc. The notification module 108 can also be used to add data to and retrieve data from the subscription data 109. For example, a management interface can be presented at the notification facilitation system 102 or a computing device in communication with the notification facilitation system 102.

The primary media provider 110 can include any system or group of systems that is programmed or otherwise configured for providing primary media content via one or more of the networks 118, 124. For example, the primary media provider 110 can be a cable news channel or other provider of televised content. The primary media provider 110 can provide programming over a cable television network 124 and provide the same or different programming over a data network 118, such as the Internet. Although FIG. 1 depicts separate networks 118, 124 for illustrative purposes, other implementations are possible. In additional or alternative aspects, the primary media provider 110 may provide different types of media content via different media channels of the same network. For example, the primary media provider 110 may provide different types of media content via different media channels over a network 118 such as the Internet to both the computing device 114 and the media device 126 (e.g., another computing device, a television configured to communicate via the Internet, etc.).

The detection system 112 can include any system or group of systems that is programmed or otherwise configured for executing a detection application 113. The detection application 113 can monitor and detect primary media content provided over a media channel of the network 124 by the primary media provider 110. As described in detail herein, the detection application 113 can perform one or more operations that identify primary media content in this media channel that matches one or more fingerprints, watermarks, or other suitable media identifiers. The detection application 113 can provide data to the notification facilitation system 102 that describes the identified primary media content. In some aspects, the notification facilitation system 102 can respond to receiving this data from the detection system 112 by providing secondary media data to the computing device 114. The computing device can use the provided secondary media data (e.g., an identifier of an advertisement) to retrieve secondary media content (e.g., a video advertisement, a banner advertisement, etc.) from the secondary media provider 116. In additional or alternative aspects, the notification facilitation system 102 can respond to receiving the data from the detection system 112 by providing the secondary media content to the computing device 114 without the computing device 114 having to retrieve the secondary media content from the secondary media provider 116.

Although FIG. 1 depicts the notification facilitation system 102 and detection system 112 as separate systems for illustrative purposes, other implementations are possible. For example, in some aspects, the same computing system or group of computing systems can perform one or more functions of both the notification facilitation system 102 and the detection system 112. Such a computing system or group of computing systems can execute program instructions for performing one or more functions of the matching module 104, the mapping module 106, the notification module 108, the detection application 113, or some combination thereof.

The secondary media provider 116 can include any system or group of systems that is programmed or otherwise configured for providing primary media content via the network 118. In a non-limiting example, the secondary media provider 116 can provide online advertising content to the computing device over the Internet. Although FIG. 1 depicts the notification facilitation system 102 and the secondary media provider 116 as separate functional blocks for illustrative purposes, other implementations are possible. For example, in additional or alternative aspects, the same computing system or group of computing systems can perform one or more functions of both the notification facilitation system 102 and the secondary media provider 116.

Figure 2:
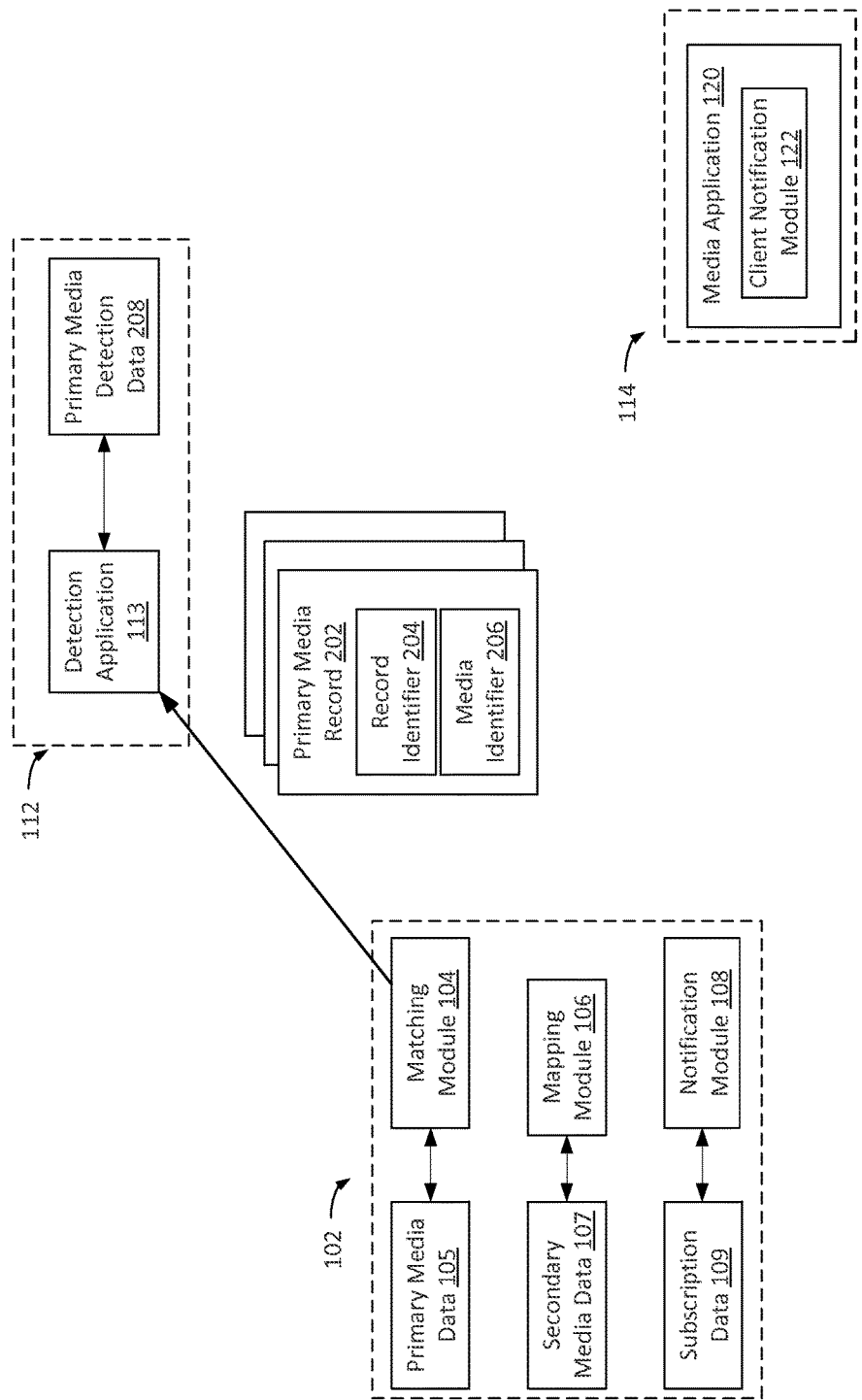
FIG. 2 is a modeling diagram that depicts an example of a notification facilitation system of FIG. 1 providing primary media data to a detection system for detecting specified primary media content according to certain aspects.

For aspects in which the notification facilitation system 102 and detection system 112 are separate systems, the notification facilitation system 102 can provide data to the detection system 112 that identifies the primary media content for which the detection system 112 should monitor the network 124. For example, FIG. 2 is a modeling diagram that depicts the notification facilitation system 102 providing primary media data to the detection system 112. The primary media data can include one or more primary media records 202. For example, the matching module 104 can retrieve primary media records 202 from the primary media data 105 and electronically transmit the primary media records 202 in a database or other suitable data structure to the detection application 113 via a data network 118.

In some aspects, each of the media records can include a record identifier 204 and at least one media identifier 206, as depicted in FIG. 2. The record identifier 204 can be an alphabetical, numeric, or alphanumeric string that can be used by the notification facilitation system 102 to uniquely identify different media fingerprints or other media identifiers in a database or other data structure. The media identifier 206 can be a fingerprint, watermark, or other data that the detection application 113 can use to identify specific primary media content. In response to identifying this primary media content, the detection application 113 can notify the notification facilitation system 102 that the primary media content has been detected by transmitting a message with the record identifier 204 to the matching module 104 via the data network 118. In additional or alternative aspects, each of the media records 202 can include a record identifier 204 and the media content or a portion thereof for which the detection application 113 is to monitor a media channel. For example, a media record 202 can include a video and a unique identifier for the video. The detection application 113 can execute one or more processes that generate a media identifier for the video (e.g., a fingerprint). The detection application 113 can use the generated media identifier to monitor the media channel.

Figure 3:
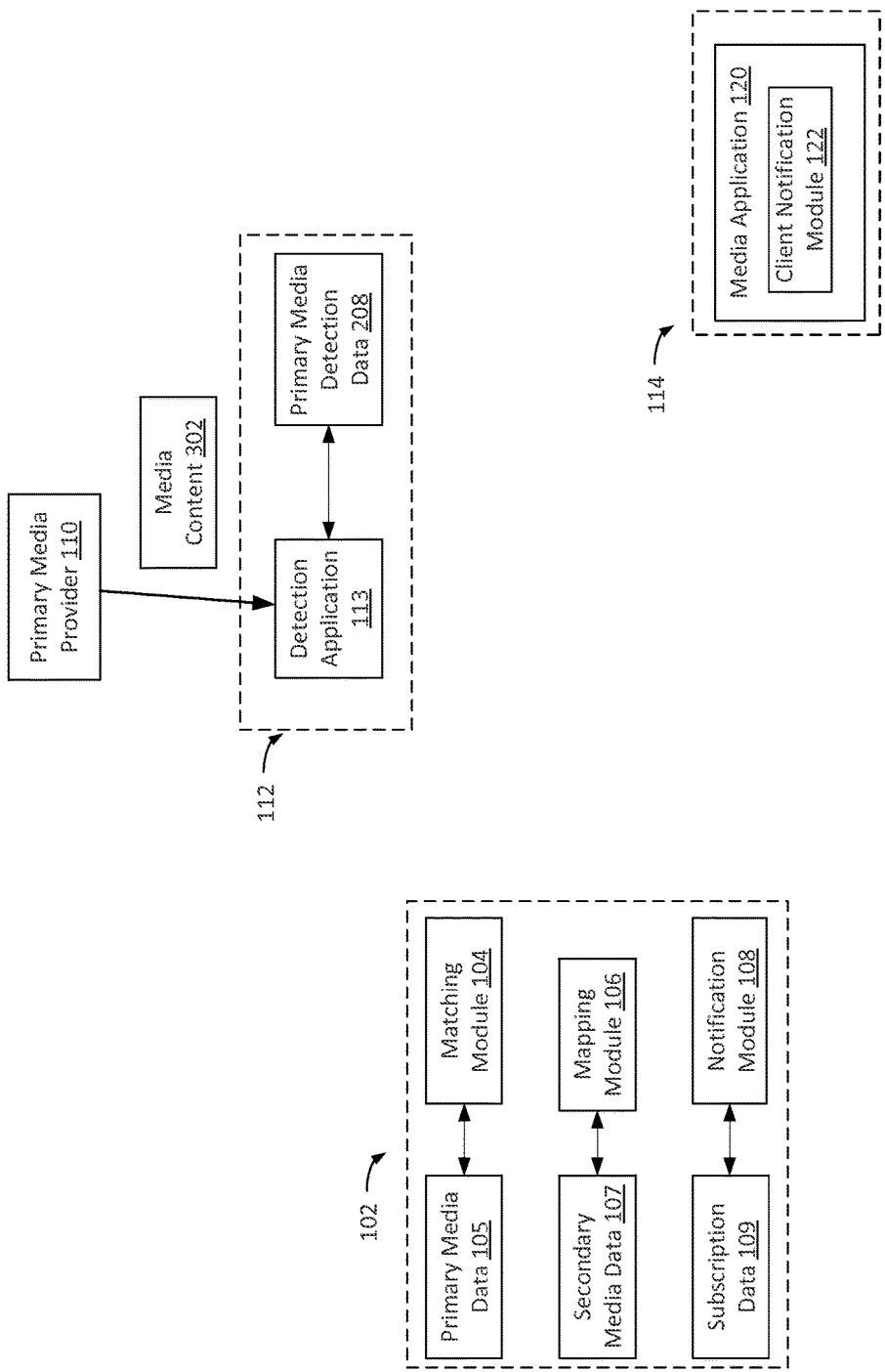
FIG. 3 is a modeling diagram that depicts an example of the detection system of FIGS. 1 and 2 detecting the specified primary media content according to certain aspects.

The detection system 112 can monitor one or more media channels to detect or otherwise identify primary media content being provided by the primary media provider 110 over a monitored media channel. For example, FIG. 3 is a modeling diagram that depicts an example of the detection system 112 detecting primary media content. The detection system 112 can be communicatively coupled to the primary media provider 110 via the network 124 (e.g., a cable television network). The detection system 112 can receive primary media content 302 from the primary media provider 110 via the network 124. One or more processing devices of the detection system 112 can execute the detection application 113 to compare the received primary media content 302 to one or more of the media identifiers 206 received from the notification facilitation system 102.

Figure 4:
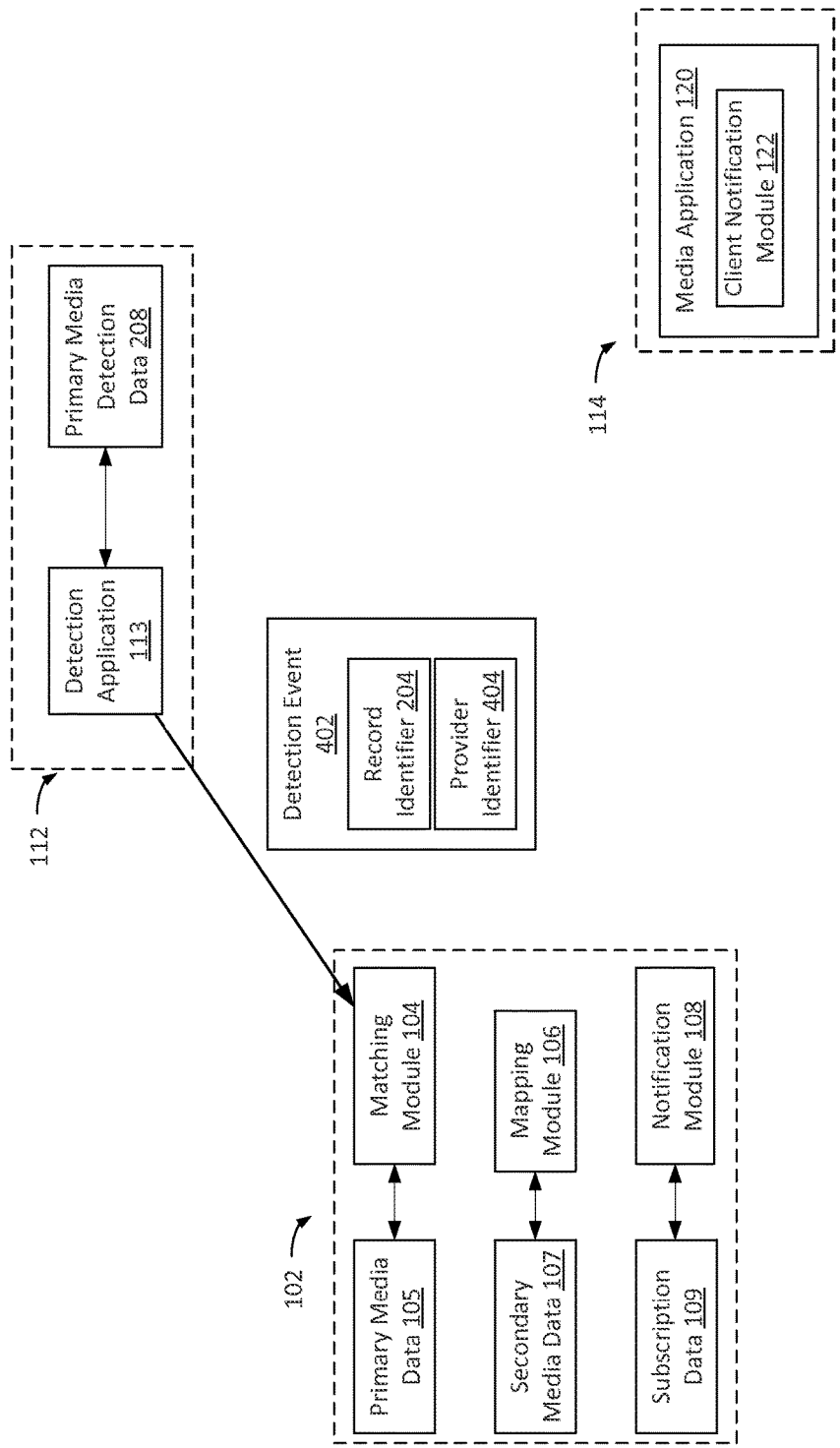
FIG. 4 is a modeling diagram that depicts an example of the detection system of FIGS. 1-3 providing a detection event that describes the detected primary media content to the notification facilitation system according to certain aspects.

If the detection system 112 determines that the media content 302 matches or otherwise corresponds to a media identifier 206, the detection system 112 can generate a detection event 402 and transmit the detection event 402 to the notification facilitation system 102, as depicted in FIG. 4. The detection event 402 can be transmitted using any suitable electronic communication, such as (but not limited to) a Hypertext Transfer Protocol ("HTTP") message. The detection event 402 can describe or otherwise identify the detected primary media content 302. For example, the detection event 402 depicted in FIG. 4 includes a record identifier 204 retrieved from a primary media record 202 (which the notification facilitation system 102 previously provided to the detection system 112) and a provider identifier 404 that identifies the primary media provider 110 from which the media content 302 was received (e.g., a television channel used to transmit the media content 302).

The notification facilitation system 102 can determine from the detection event 402 that specific primary media content has been or is being provided via a monitored media channel by a specific primary media provider 110. The matching module 104 can use the record identifier 204 to access a media identifier for the primary media content from the primary media data 105. The matching module 104 can use the provider identifier 404 received from the detection system 112 to identify the primary media provider 110 that is providing (or that has provided) the primary media content.

Figure 5:
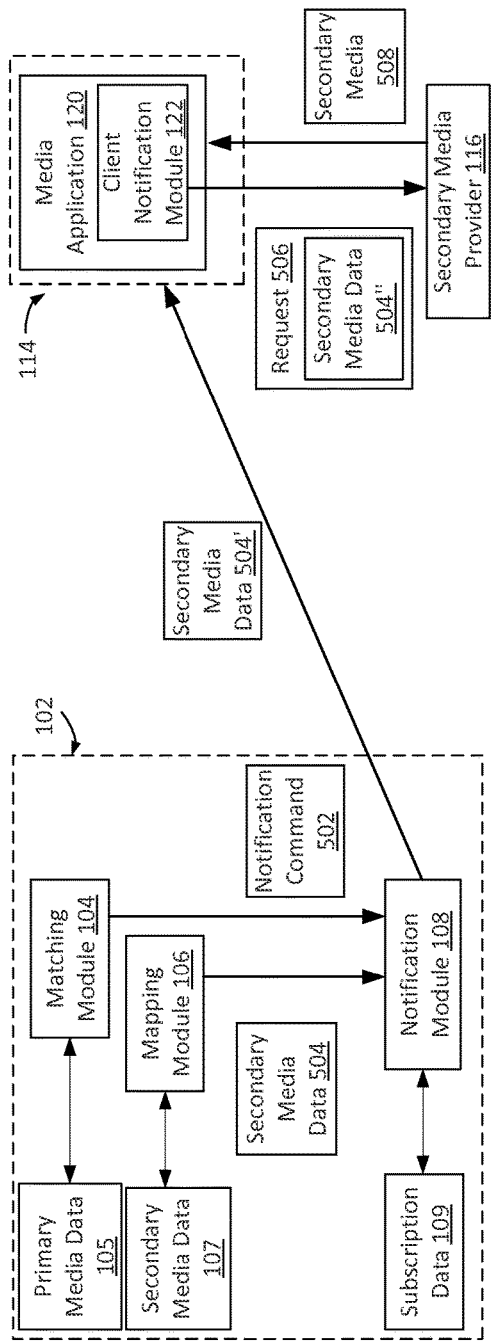
FIG. 5 is a modeling diagram that depicts an example of the notification facilitation system of FIGS. 1-4 providing secondary media data to a computing device that can be used to retrieve secondary media content from a secondary media provider according to certain aspects.

The notification facilitation system 102 can respond to receiving the detection event 402 by providing secondary media data to the computing device 114, as depicted in FIG. 5. The matching module 104 can provide a notification command 502 to the notification module 108 to identify one or more computing devices 114 that are to receive secondary media data that includes (or can be used to retrieve) secondary media content that relates to or is otherwise associated with the detected primary media content 302.

The notification module 108 can access the subscription data 109 to determine that the computing device 114 uses a media application 120 configured for executing or otherwise using the detected primary media content 302. For example, the provider identifier 404 may identify a primary media provider 110 such as "NewsTV." A record in the subscription data 109 may indicate that a given computing device 114 has a media application 120 such as "NewsTV Mobile" that is used to access media content from the primary media provider 110. The notification module 108 can thus determine that secondary media data is to be provided to the computing device 114 identified in the subscription data 109.

The notification module 108 can request secondary media data from the mapping module 106. For example, the mapping module 106 can receive the provider identifier 404 from the matching module 104 or the notification module 108 and can receive information about the computing device 114 (e.g., device type, screen size, etc.) from the notification module 108. The mapping module 106 can retrieve, generate, or otherwise obtain secondary media data 504 based on the provider identifier 404 and the information about the computing device 114. For example, the mapping module 106 can retrieve an identifier for a secondary content item (e.g., a marketing campaign, an advertisement identifier, etc.) that is associated with the primary media provider 110 or the detected media content 302 and that can be displayed on the computing device 114 (e.g., an advertisement having dimensions smaller than the screen). The mapping module 106 can also retrieve data describing the application programming interface used to access the secondary media content item (e.g., ORMMA, MRAID, etc.).

The mapping module 106 can provide secondary media data 504 to the notification module 108 that includes the retrieved information about the secondary content item. The notification module 108 can transmit an electronic message that includes secondary media data 504' via the data network 118 to a client notification module 122 executed at the computing device 114. The secondary media data 504' can include at least some of the secondary media data 504. For example, the secondary media data 504' can be a URL or other network address for secondary media content hosted by the secondary media provider 116. The client notification module 122 executed at the computing device 114 can transmit a request 506 for the secondary media content via the data network 118 to the secondary media provider 116. The request 506 can include secondary media data 504" that includes at least some of the secondary media data 504' received by the computing device 114 from the notification facilitation system 102.

The secondary media provider 116 can respond to the request 506 by transmitting the requested secondary media content 508 to the computing device 114 via the data network 118. The media application 120 executed at the computing device 114 can display, execute, or otherwise use the secondary media content 508 received from the secondary media provider 116.

In some aspects, the secondary media data 504 can include information that the client notification module 122 can use to request the secondary media content, as described above with respect to FIG. 5. In additional or alternative aspects, the secondary media data 504 can include the secondary media content. For example, the notification facilitation system 102 can provide an advertisement or other secondary media content directly to the computing device 114 without the computing device 114 having to transmit a separate request to the second media provider 116.

Figure 6:
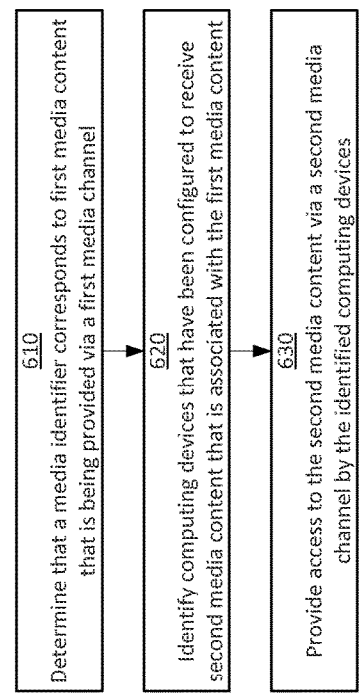
FIG. 6 is a flow chart illustrating an example of a method for providing access to media content via a media channel based on associated content being provided over a different media channel according to certain aspects.

FIG. 6 is a flow chart illustrating an example of a method 600 for providing access to media content via a media channel based on associated content being provided over a different media channel. For illustrative purposes, the method 600 is described with reference to the implementation depicted in FIGS. 1-5. Other implementations, however, are possible.

The method 600 involves determining that a media identifier corresponds to first media content that is being provided via a first media channel, as depicted in block 610. For example, a suitable processing device can execute a detection application 113 that analyzes at least some of the media content 302 provided over a monitored media channel. The detection application 113 can obtain a media identifier from the media content 302. The detection application 113 can also retrieve a stored media identifier from a database or other suitable data structure that is stored on a non-transitory computer-readable medium or is accessible via a data network. The detection application 113 can compare the media identifier obtained from the media content with the stored media identifier. The detection application 113 can determine that the media identifier corresponds to media content provided via the first media channel based on the media identifiers at least partially matching one another.

In some aspects, determining that a media identifier corresponds to media content 302 can additionally or alternatively involve receiving, via a data network, an electronic communication indicating that a remote computing system has identified a correspondence between the first media content and the media identifier. For example, the detection application 113 can be executed on a detection system 112 that is accessible over a data network by the notification facilitation system 102. The detection application 113 can compare a media identifier obtained from the media content 302 with a stored media identifier to determine that the media identifiers at least partially match one another. The detection system 112 can execute the detection application 113 to generate a detection event 402 or other electronic message that identifies the match between media identifiers, as described above with respect to FIG. 4. The detection application 113 can transmit the detection event 402 or other electronic message to the notification facilitation system 102 via the data network 118. The notification facilitation system 102 can determine from the received message that the media content 302 corresponding to a media identifier from the primary media data 105 is being provided over the first media channel. In additional or alternative aspects, the detection application 113 can be executed by the notification facilitation system 102 rather than a remote computing system.

In some aspects in which a remote computing system (e.g., the detection system 112) executes the detection application 113, the notification facilitation system 102 can provide one or more media identifiers to the remote computing system that are used by the remote computing system to monitor media content over the media channel. For example, the notification facilitation system 102 can execute the matching module 104 to generate, retrieve, or otherwise obtain one or more media identifiers to be used by a remote detection system 112. The notification facilitation system 102 can transmit one or more electronic communications to the detection system 112 that include the media identifiers obtained by the matching module 104, as described above with respect to FIG. 2. The detection system 112 can receive the electronic communications over the data network. The detection system 112 can use the media identifiers from the received electronic communications to monitor media content 302 transmitted by the primary media provider 110 via the network 124.

In additional or alternative aspects, one or more processing devices of the notification facilitation system 102 can execute program instructions that generate the media identifiers used by the detection application 113. For example, these program instructions can include a fingerprinting module. Executing the program instructions can generate a reference fingerprint (e.g., an audio fingerprint, a video fingerprint, or some combination thereof) from media content (e.g., an audio stream, a video stream, or some combination thereof) that is to be provided by the primary media provider 110. The processing device of the notification facilitation system 102 can store the generated reference fingerprint or other media identifier in a database or other suitable data structure. The stored reference fingerprint or other media identifier can be indexed in the database or other suitable data structure by an identifier for an advertisement or other media content provided by the primary media provider 110.

In additional or alternative aspects, the matching module 104 can determine that media content 302 identified by a remote computing system is included in a set of primary media data 105 tracked by the notification facilitation system 102. In one non-limiting example, the notification facilitation system 102 may delete a given media identifier from the primary media data 105 or otherwise modify the primary media data 105 to indicate that the given media identifier should no longer be tracked. The notification facilitation system 102 can subsequently receive a detection event 402 indicating that the detection application 113 has identified media content 302 that corresponds to a media identifier. The notification facilitation system 102 can execute the matching module 104 to determine if the media identifier that is identifiable from the detection event 402 is the deleted or inactive media identifier. If the media identifier that is identifiable from the detection event 402 is the deleted or inactive media identifier, a processing device of the notification facilitation system 102 can terminate the method 600. If the media identifier is an active media identifier that is being tracked by the notification facilitation system 102, the method 600 can continue.

The method 600 also involves identifying computing devices that have been configured to receive second media content that is associated with the first media content provided over the first media channel, as depicted in block 620. For example, one or more processing devices of the notification facilitation system 102 can execute the notification module 108 to identify the computing devices 114 configured to the receive related or otherwise associated media content. The notification module 108 can reference the subscription data 109 to determine which computing devices 114 are to receive the additional media content.

In some aspects, the notification module 108 can identify the computing devices 114 that have been configured to receive the second media content based on a type of media application 120 installed on the computing devices 114. For example, the primary media provider 110 may be an entity that provides news programming (e.g., "NewsTV") over both a cable network 124 (e.g., a "NewsTV" cable channel) and a data network 118 (e.g., a "NewsTV" website). The notification module 108 can determine from the subscription data 109 that one or more computing devices 114 executes a media application 120 that is configured to receive content from the primary media provider 110 via the network 118. In one non-limiting example, the media application 120 may be an application that is specifically configured to access content from the primary media provider 110 (e.g., a "NewsTV" mobile application) and may be unable to access content from other media providers. The subscription data 109 may include a record for a computing device 114 that indicates that the "NewsTV" mobile application is installed on the computing device 114. The notification module 108 can identify the computing device 114 as being configured to receive the second media content based on the "NewsTV" mobile application being installed on the computing device 114.

In additional or alternative aspects, the notification module 108 can identify the computing devices 114 configured to receive the second media content based on receiving a notification from a computing device 114 that the media application 120 is accessing content from the primary media provider 110. For example, if the primary media provider 110 is an entity that provides news programming (e.g., "NewsTV") over both a cable network 124 (e.g., a "NewsTV" cable channel) and a data network 118 (e.g., a "NewsTV" website), a client notification module 122 executed at the computing device 114 may monitor the media application 120 to determine if the media application 120 is accessing content from the primary media provider 110. If the media application 120 is accessing content from the primary media provider 110, the client notification module 122 can transmit an electronic communication to the notification module 108 via the data network 118 indicating that the media application 120 is accessing content from the primary media provider 110. The notification facilitation system 102 can identify the computing device as being configured to receive second media content based on receiving the notification from the client notification module 122. In one non-limiting example, the media application 120 may be an application that is specifically configured to access content from the primary media provider 110 (e.g., a "NewsTV" mobile application) and may be unable to access content from other media providers. The client notification module 122 can transmit a notification to the notification facilitation system 102 in response to a user activating the media application 120 (e.g., turning on the media application, switching an active window to the media application, etc.). In another non-limiting example, the media application 120 may be a web browser or other application that can access a website of the primary media provider 110. The client notification module 122 can transmit an electronic communication to the notification facilitation system 102 indicating that the web browser accessing the website of the primary media provider 110.

The method 600 also involves providing access to the second media content via a second media channel by the identified computing devices, as depicted in block 630. One or more processing devices of the notification facilitation system 102 can execute the notification module 108 to provide access to the second media content by the identified computing devices 114 via a media channel of the network 118. In some aspects, providing access to the second media content can involve generating and transmitting secondary media data 504 to the identified client devices 114 via the data network 118, as described above with respect to FIG. 5. The secondary media data 504 can be used by the client computing devices 114 to retrieve secondary media content from a secondary media provider 116, as described above with respect to FIG. 5. In additional or alternative aspects, providing access to the associated media content can involve the notification facilitation system 102 transmitting the secondary media content to the identified client devices 114 via the data network 118.

The notification facilitation system 102 can execute the mapping module 106 to identify the secondary media content to which the computing devices 114 are to be provided access. In some aspects, the mapping module 106 may identify the media content based on a type of media content that can be executed, displayed, or otherwise outputted by a given computing device 114. For example, the subscription data 109 may indicate that the computing device 114 has a video player application that is configured to play specific types of video content. The mapping module 106 may generate secondary media data 504 that can be used by the computing device 114 to retrieve secondary content (e.g., video advertisements) that are compatible with the video player of the computing device 114.

In additional or alternative aspects, the mapping module 106 may identify the media content based on a hardware characteristic of the computing device 114. A non-limiting example of a hardware characteristic of the computing device 114 include one or more dimensions (e.g., height, width) of a display screen that is included in or communicatively coupled to the computing device 114. For instance, the subscription data 109 may indicate that the computing device 114 has a display screen with a given set of dimensions. The mapping module 106 may generate secondary media data 504 that can be used by the computing device 114 to retrieve secondary content items that can be fully displayed on a screen with the given set of dimensions (e.g., a banner advertisement having an aspect ratio similar to the screen of the computing device 114). In another non-limiting example, the subscription data 109 may indicate that the computing device 114 is a smart phone or other type of computing device with one or more processing constraints (e.g., less memory, slower processor, less sophisticated graphics) as compared to a laptop or desktop computer. The mapping module 106 may generate secondary media data 504 that can be used by the computing device 114 to retrieve secondary content items that can be used effectively in view of these processing constraints. For example, the mapping module 106 may select a banner advertisement for a first computing device 114 that is a smart phone and may select a video advertisement for a second computing device 114 that is a laptop computer.

Although, for illustrative purposes, certain parameters used to select a type of media content are discussed above, any suitable parameter can be used by the mapping module 106 or other suitable program code to select media content to be provided to a computing device 114. Non-limiting examples of such suitable parameters include the identity or type of media application 120 that is utilizing a client notification module 122 or other software development kit, a type of integration with the media application 120 (e.g., ORMMA, MRAID, etc.), the media type of the secondary media data 504 to be provided (e.g., HTML, video, etc.), and/or any other suitable parameter that may be added based on the desired behavior of a system for facilitating the provision of associated media content over a second media channel.

In some aspects, one or more functions of the detection application 113, the matching module 104, the mapping module 106, and/or the notification module 108 can be performed by a single device. For example, the notification facilitation system 102 may be implemented using a set-top unit or other suitable device for receiving cable television channels over a cable network 124. This set-top unit may execute software instructions for performing one or more functions of the detection application 113, the matching module 104, the mapping module 106, and/or the notification module 108. The set-top unit can identify media content being broadcasted via one or more of the received cable television channels that corresponds to a given media identifier, as described above with respect to block 610. The set-top unit can identify one or more computing devices 114 that are registered with the cable subscription and that are configured to receive related media content, as described above with respect to block 620. The computing devices 114 may be in communication with the set-top unit over a data network 118 via a cable modem and/or network router that is communicatively coupled to the set-top unit. The set-top unit can provide the computing devices 114 with access to the related media content, as described above with respect to block 630. For example, the set-top unit can transmit secondary media data 504 to the computing devices via the cable modem and/or network router.

Figures 7, 8:
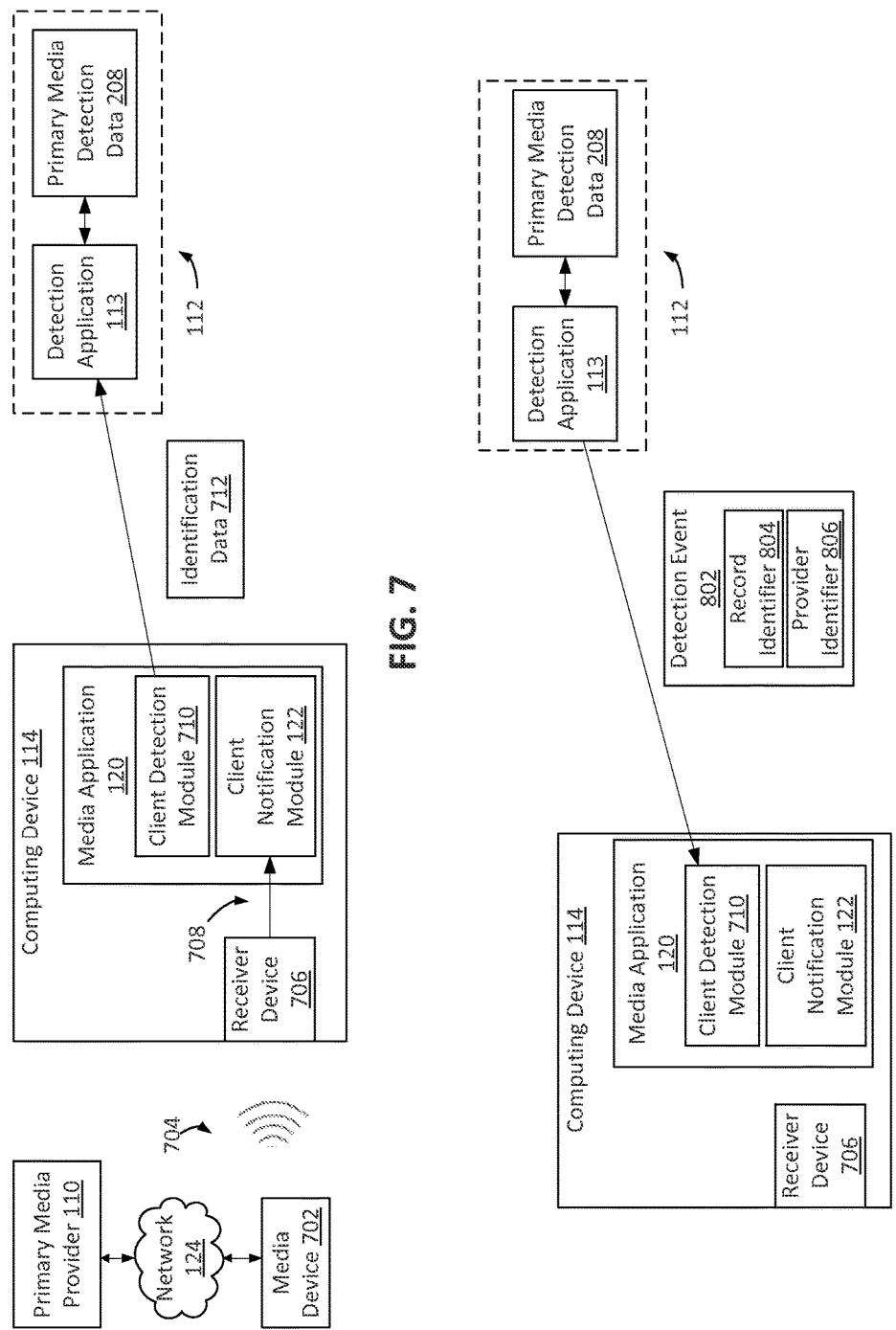
FIG. 7 is a modeling diagram that depicts an example of a computing device detecting primary media content presented by a media device that is near the computing device according to certain aspects.
FIG. 8 is a modeling diagram that depicts an example of a detection system providing a detection event that describes the detected primary media content to the computing device of FIG. 7 according to certain aspects.

In additional or alternative aspects, a computing device 114 can perform one or more functions for monitoring primary media content provided by a primary media provider 110. For example, FIG. 7 is a modeling diagram that depicts an example of a computing device 114 detecting primary media content presented by a media device 702 near the computing device 114. Non-limiting examples of a media device 702 include a television, a radio, another computing device, etc. The media device 702 can be communicatively coupled to the primary media provider 110 via the network 124. For example, a media device 702 such as television can be communicatively coupled to a primary media provider 110 such as a cable television provider via a cable network 124. The media device 702 can emit signals 704 in the vicinity of the computing device 114. Non-limiting examples of the signals 704 include sound waves (e.g., from the audio played by a television), light waves (e.g., from video images displayed on the television), etc.

The computing device 114 can include a receiver device 706 that can receive the signals 704. In one non-limiting example, the receiver device 706 can be a microphone that can receive audio signals 704 emitted by the media device 702. In another non-limiting example, the receiver device 706 can be a camera that can capture images from light signals 704 emitted by the media device 702. A client notification module 122 executed by the computing device 114 can receive digital data 708 that represents the signals received by the receiver device 706.

In some aspects, the computing device 114 can transmit identification data 712 to the detection system 112 via a data network 118. In some aspects, the identification data 712 can include a media identifier generated from the digital data 708 received by the client notification module 122. For example, a client detection module 710 can be executed by the computing device 114 that generates a fingerprint or other media identifier from the digital data 708. In other aspects, the identification data 712 can include at least a portion of the digital data 708 received by the client notification module 122. For example, the client detection module 710 can be executed by the computing device 114 that extracts a portion of the digital data 708 and transmits the extracted digital data with the identification data 712 to the detection application 113. The detection application 113 can generate a fingerprint or other media identifier from the extracted digital data received with the identification data 712.

The detection application 113 can generate a detection event 802 and transmit the detection event 802 to the computing device 114, as depicted in FIG. 8. The detection event 802 can include a record identifier 804 and a provider identifier 806. The detection application 113 can generate the detection event 802 with the record identifier 804 and the provider identifier 806 in a similar manner as described above with respect to the detection event 402, the record identifier 204, and the provider identifier 404 depicted in FIG. 4.

Figure 9:
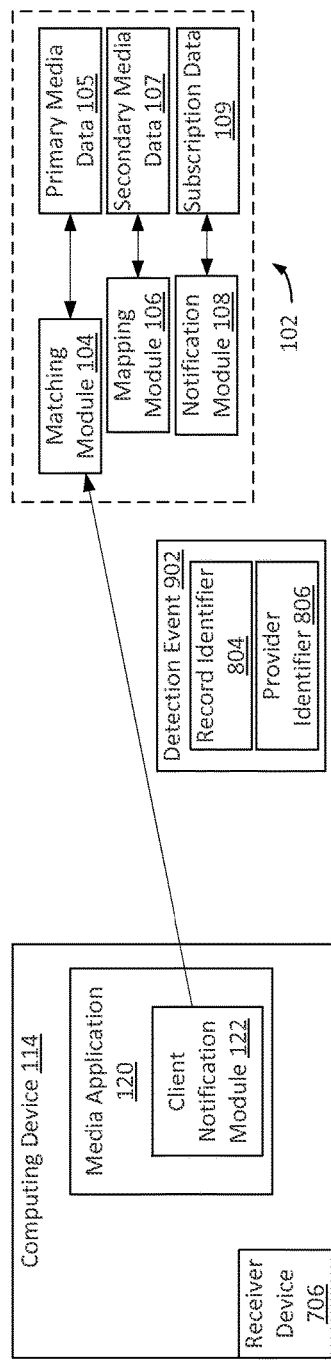
FIG. 9 is a modeling diagram that depicts the computing device of FIG. 7 providing the detection event of FIG. 8 to a notification facilitation system according to certain aspects.
Figure 10:
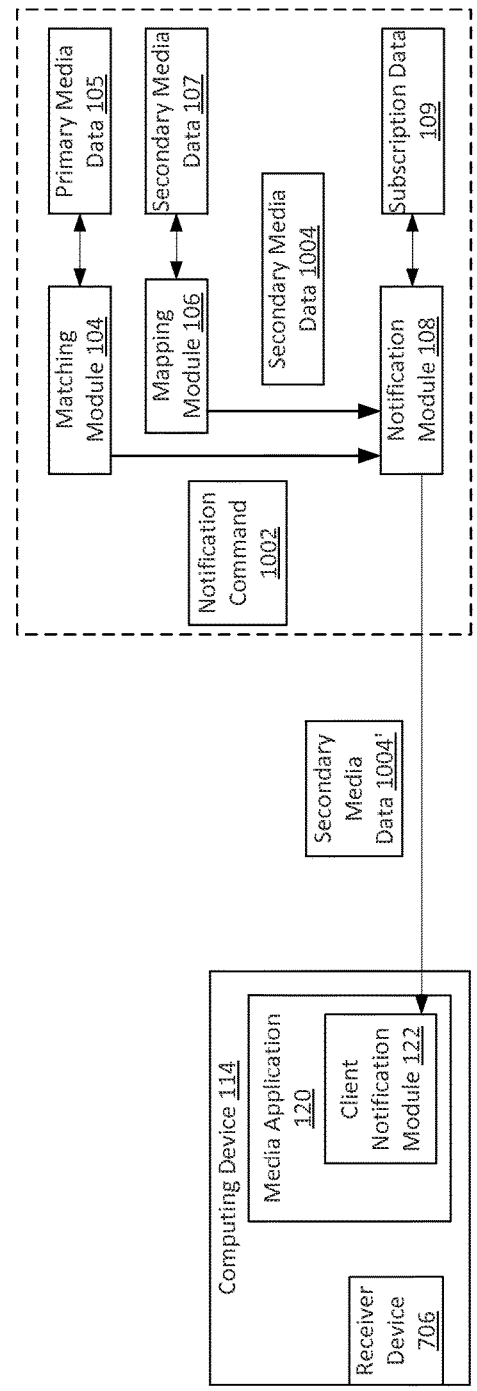
FIG. 10 is a modeling diagram that depicts an example of the notification facilitation system of FIG. 9 providing secondary media data to the computing device of FIG. 7 that can be used to retrieve secondary media content from a secondary media provider according to certain aspects.

The computing device 114 can obtain secondary media data using the record identifier 804 and the provider identifier 806. The computing device 114 can transmit a detection event 902 to the notification facilitation system 102, as depicted in FIG. 9. For example, the client notification module 122 can transmit the detection event 902 to the matching module 104 via the data network 118. The detection event 902 can include the record identifier 804 and the provider identifier 806. The matching module 104 can respond to receiving the detection event 902 by providing a notification command 1002 to the notification module 108. The matching module 104 can generate the notification command 1002 using the record identifier 804 and the provider identifier 806 in a similar manner as described above with respect to the notification command 502 depicted in FIG. 5. The notification module 108 can obtain secondary media data 1004 from the mapping module 106 and provide at least some secondary media data 1004' to the computing device 114 via the data network 118. The notification module 108 can do so in a similar manner as described above with respect to the secondary media data 504 depicted in FIG. 5. The operations described above with respect to block 610 can include the notification facilitation system 102 using the detection event 902 to determine that a media identifier corresponds to the media content being provided over a media channel by the primary media provider 110.

In additional or alternative aspects, the computing device 114 may generate the detection event 802 without transmitting the identification data 712 to the detection system 112. For example, the client detection module 710 can access a local database or other suitable data structure stored in a non-transitory computer-readable medium of the computing device 114. The local database can include reference fingerprints or other media identifiers provided from the notification facilitation system 102 to the computing device 114. The client detection module 710 can generate a detection event 902 by determining that a media identifier generated from the digital data 708 matches or otherwise corresponds to a media stored at the computing device 114.

In additional or alternative aspects, the detection system 112 can transmit the detection event 802 to the notification facilitation system 102 rather than (or in addition to) transmitting the detection event 802 to the computing device 114. The notification facilitation system 102 can obtain and transmit the secondary media data 1004 to the computing device 114 in response to receiving the detection event 802 from the detection system 112. The operations described above with respect to block 610 can include the notification facilitation system 102 using the detection event 802 to determine that a media identifier corresponds to the media content being provided over a media channel by the primary media provider 110.

Any suitable computing systems can be used to implement the aspects described above. For example, FIG. 11 is a block diagram that depicts example systems for implementing certain aspects.

Figure 11:
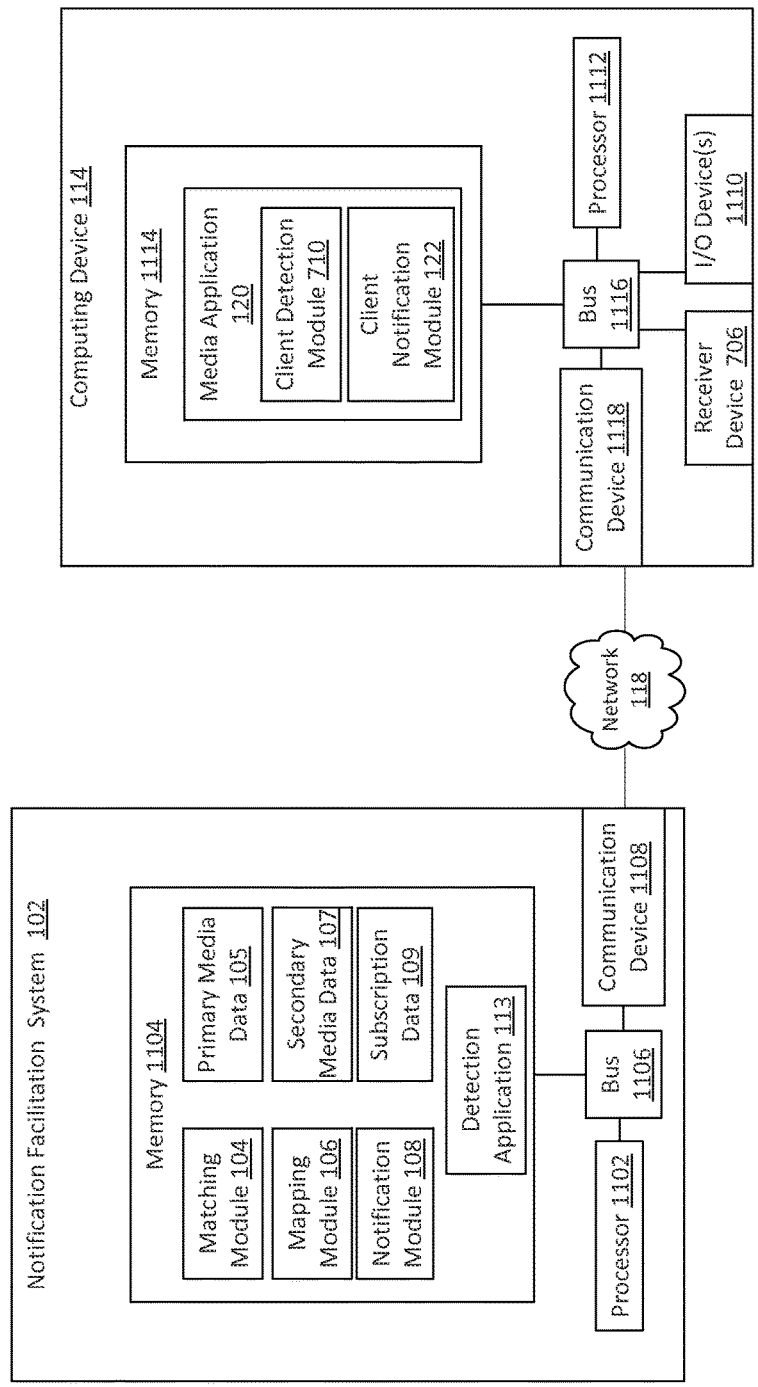
FIG. 11 is a block diagram that depicts example systems for implementing certain aspects.

The notification facilitation system 102 and the computing device 114 depicted in FIG. 11 can respectively include processors 1102, 1112. Non-limiting examples of the processors 1102, 1112 include a microprocessor, a field-programmable gate array ("FPGA") an application-specific integrated circuit ("ASIC"), a state machine, or other suitable processing device. Each of the processors 1102, 1112 can include any number of processing devices, including one. The processors 1102, 1112 can be communicatively coupled to computer-readable media, such as memory devices 1104, 1114. The processors 1102, 1112 can execute computer-executable program instructions and/or otherwise access information respectively stored in the memory devices 1104, 1114.

Each of the memory devices 1104, 1114 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The notification facilitation system 102 and the computing device 114 depicted in FIG. 11 respectively include buses 1106, 1116. Each of the buses 1106, 1116 can communicatively couple one or more components of a respective one of the notification facilitation system 102 and the computing device 114.

Although the processors 1102, 1112, the memory devices 1104, 1114, and the buses 1106, 1116 are respectively depicted in FIG. 11 as separate components in communication with one another, other implementations are possible. For example, the processors 1102, 1112, the memory devices 1104, 1114, and the buses 1106, 1116 can be respective components of respective printed circuit boards or other suitable devices that can be disposed in a notification facilitation system 102 and/or a computing device 114 to store and execute programming code.

The notification facilitation system 102 and computing device 114 can also include respective communication devices 1108, 1118. The communication devices 1108, 1118 can be configured to establish a communication link 112. Non-limiting examples of the communication devices 1108, 1118 include Ethernet transceivers, modems, etc. The computing device 114 can also include one or more input or output devices 1110 for receiving input or output (e.g., a keyboard, a mouse, a touchscreen, a display screen, etc.).

FIG. 11 also depicts the matching module 104, the primary media data 105, the mapping module 106, the secondary media data 107, the notification module 108, the subscription data 109, and the detection application 113 stored in the memory device 1104 of the notification facilitation system 102. The processor 1102 can execute one or more of the matching module 104, the mapping module 106, the notification module 108, and the detection application 113 to perform one or more operations described herein. In some aspects, one or more of the matching module 104, the primary media data 105, the mapping module 106, the secondary media data 107, the notification module 108, the subscription data 109, and the detection application 113 can be omitted.

FIG. 11 also depicts the media application 120, the client notification module 122, and the client detection module 710 stored in the memory device 1114 of the computing device 114. The processor 1112 can execute one or more of the client notification module 122, and the client detection module 710 to perform one or more operations described herein. In some aspects, one or more of the client notification module 122 and the client detection module 710 can be omitted.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific examples thereof, it will be appreciated that those skilled in the art, upon attaining an understanding of the foregoing, may readily produce alterations to, variations of, and equivalents to such examples. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for distributing media content via at least one media channel based on associated content provided over another media channel, comprising:
    making a determination, by a processing device, as to whether a media identifier corresponds to first media content that is being provided via a first media channel, the first media content containing at least one of video and audio and the media identifier being based on information of the first media content, wherein making the determination comprises receiving an electronic communication via a data network that a remote computing system has identified a correspondence between the first media content and the media identifier;
    identifying, by the processing device, when the determination is made that the media identifier corresponds to the first media content, a plurality of computing devices that have been configured to receive second media content that is associated with the first media content, the second media content containing at least one of video and audio;
    transmitting the second media content toward the identified plurality of computing devices via at least one second media channel;
    transmitting the media identifier to the remote computing system prior to receiving the electronic communication; and
    generating, by the processing device, the media identifier from the first media content prior to the first media content being provided via the first media channel.

2. The method of claim 1, wherein the media identifier comprises at least one of a fingerprint and a watermark.

3. The method of claim 1, wherein first media content and second media content are supplied by different providers.

4. The method of claim 1, wherein the transmitting of the second media content to the plurality of computing devices is via a data network.

5. A method for distributing media content via at least one media channel based on associated content provided over another media channel, comprising:
    making a determination, by a processing device, as to whether a media identifier corresponds to first media content that is being provided via a first media channel, the first media content containing at least one of video and audio and the media identifier being based on information of the first media content;
    identifying, by the processing device, when the determination is made that the media identifier corresponds to the first media content, a plurality of computing devices that have been configured to receive second media content that is associated with the first media content, the second media content containing at least one of video and audio;

transmitting the second media content toward the identified plurality of computing devices via at least one second media channel; and identifying, for each computing device of the plurality of computing devices, at least one of (i) a respective type of the second media content that can be outputted by the computing device or a (ii) a respective item of the second media content that can be outputted by the computing device;

wherein the at least one of the respective type or the respective content item is identified based on at least one respective hardware characteristic of the computing device.

6. The method of claim 5, wherein the at least one of the respective type or the respective content item is also identified based on a respective media application employed by the computing device to output the second media content.

7. A system for distributing media content via at least one media channel based on associated content provided over another media channel, the system comprising:

a processing device; and a memory coupled to the processing device, wherein the processing device is configured to execute instructions stored in the memory to perform operations comprising:

making a determination, by the processing device, as to whether a media identifier corresponds to first media content that is being provided via a first media channel, the first media content containing at least one of video and audio and the media identifier being based on information of the first media content, wherein making the determination comprises receiving an electronic communication via a data network that a remote computing system has identified a correspondence between the first media content and the media identifier;

identifying, by the processing device, when the determination is made that the media identifier corresponds to the first media content, a plurality of computing devices that have been configured to receive second media content that is associated with the first media content, the second media content containing at least one of video and audio;

causing the second media content to be transmitted toward the identified plurality of computing devices via at least one second media channel;

generating the media identifier from the first media content prior to the first media content being provided via the first media channel; and transmitting the generated media identifier to the remote computing system.

8. The system of claim 7, wherein the media identifier comprises at least one of a fingerprint and a watermark.

9. The system of claim 7, wherein first media content and second media content are supplied by different providers.

10. A system for distributing media content via at least one media channel based on associated content provided over another media channel, the system comprising:

a processing device; and a memory coupled to the processing device, wherein the processing device is configured to execute instructions stored in the memory to perform operations comprising:

making a determination, by the processing device, as to whether a media identifier corresponds to first media content that is being provided via a first media channel, the first media content containing at least one of video and audio and the media identifier being based on information of the first media content;

identifying, by the processing device, when the determination is made that the media identifier corresponds to the first media content, a plurality of computing devices that have been configured to receive second media content that is associated with the first media content, the second media content containing at least one of video and audio;

causing the second media content to be transmitted toward the identified plurality of computing devices via at least one second media channel; and identifying, for each computing device of the plurality of computing devices, at least one of (i) a respective type of the second media content that can be outputted by the computing device or a (ii) a respective item of the second media content that can be outputted by the computing device;

wherein the at least one of the respective type or the respective content item is identified based on at least one respective hardware characteristic of the computing device.

11. The system of claim 10, wherein the at least one of the respective type or the respective content item is identified also based on a respective media application employed by the computing device to output the second media content.

* * * * *